(12) United States Patent
Oneda (10) Patent No.: US 6,266,440 B1
(45) Date of Patent: Jul. 24, 2001

(54) COLOR IMAGE DATA COMPRESSING APPARATUS

(75) Inventor: Shogo Oneda, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/184,900

(22) Filed: Nov. 3, 1998

(30) Foreign Application Priority Data

Nov. 26, 1997 (JP) .................................... 9-340734

(51) Int. Cl.[7] ............................................ G06K 9/36
(52) U.S. Cl. ....................... 382/166; 382/251; 375/240.03
(58) Field of Search ............................... 382/162, 166, 382/167, 251, 252, 253; 358/518, 520, 523, 539, 1.9; 375/240.22, 240.03

(56) References Cited

U.S. PATENT DOCUMENTS

| | | | |
|---|---|---|---|
| 4,887,151 | * 12/1989 | Wataya | 358/539 |
| 5,341,441 | * 8/1994 | Maeda et al. | 358/539 |
| 5,369,439 | * 11/1994 | Matsuda et al. | 372/240.03 |
| 5,930,386 | * 7/1999 | Saito | 382/166 |
| 6,058,217 | * 5/2000 | Kondo | 382/251 |
| 6,075,619 | * 6/2000 | Iizuka | 382/166 |

FOREIGN PATENT DOCUMENTS 63-185163    7/1988   (JP) .

* cited by examiner

*Primary Examiner*—Amelia M. Au
*Assistant Examiner*—J. Wu
(74) *Attorney, Agent, or Firm*—Oblon, Spivak, McClelland, Maier & Neustadt, P.C.

(57) ABSTRACT

A color image data compressing apparatus comprising a color space converting section for receiving RGB data and outputting data for lightness and chromaticity, a plurality of space converting sections each for converting the data from actual space to a coefficient in each specified transform space, a plurality of quantizing sections each for quantizing the coefficient, and a coding section for coding the quantized data, in which the degree of quantization of the coefficient data is changed according to data for lightness.

3 Claims, 6 Drawing Sheets

FIG.2

ACTUAL SPACE DATA → WAVELET TRANSFORM → WAVELET COEFFICIENT $LL = (a; b; c; d) / 4$
$LH = (a-b+c-d) / 2$
$HL = (a+b-c-d) / 2$
$HH = a-b-c+d$

COLOR IMAGE DATA COMPRESSING APPARATUS

FIELD OF THE INVENTION

The present invention relates to a technology of compressing and coding color image data for its storage or transmission.

BACKGROUND OF THE INVENTION

When color image data is to be transmitted or accumulated, the color image data is subjected to the processing for compression and coding in order to suppress an amount of information to be processed.

A conventional type of image data compression method is generally a method, as typified by JPEG (Joint Photographic Expert Group) method, of dividing image data into blocks each having a plurality of pixels, subjecting each of the blocks to specified conversion and then compressing the data by quantization. A technology related to the color image data converting apparatus is disclosed in Japanese Patent Laid-Open Publication No. SHO 63-185163.

Figure 7:
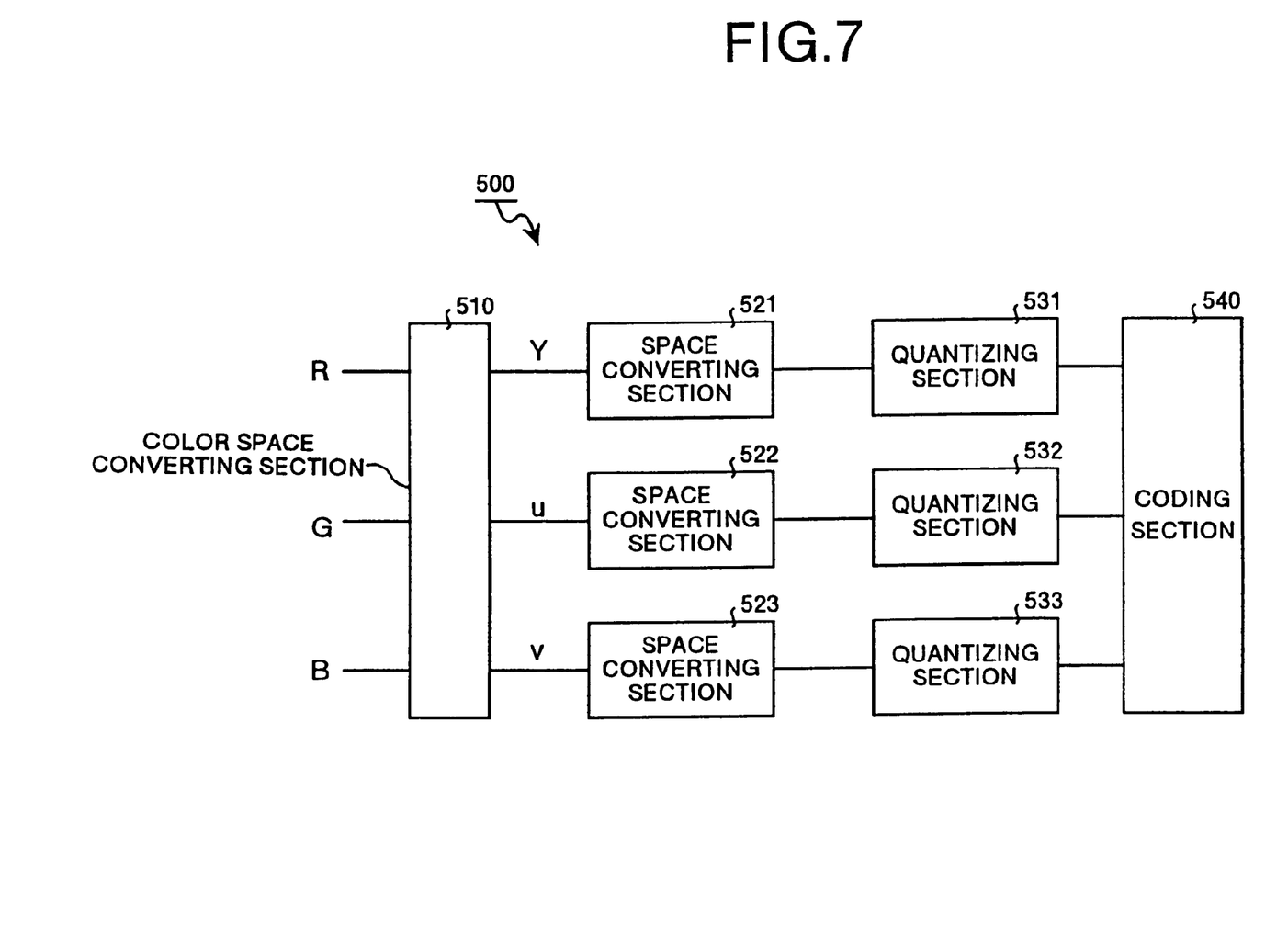
FIG. 7 is a block diagram showing an example of the color image data compressing apparatus based on the conventional technology.

In the color image data converting apparatus disclosed in this Publication, as shown in FIG. 7, at first, image data for inputted three colors of RGB is converted into data for lightness (Y) and chromaticity (u, v) in a color space converting section 510. Then, each of the data (Y, u, v) is inputted into corresponding space converting sections 521, 522 and 523, where it is subjected to space conversion for each block having a plurality of pixels. Then, the data is quantized in corresponding quantizing sections 531, 532 and 533 and coded in a coding section 540. By converting an input color image data into information for lightness and color, and then subjecting the data to space conversion, quantization and coding, compression efficiency of color image data can be enhanced.

In the conventional type of technology as disclosure in the above Publication, however, the data for lightness (Y) and chromaticity (u, v) converted in the color space converting section 510 is uniformly quantized in each of the quantizing sections 531, 532 and 533 regardless of characteristics of input color image data such as a difference in its lightness or the like. Therefore, the compression may be insufficient or it may be too heavy depending on color, and hence image quality may be degraded.

SUMMARY OF THE INVENTION

It is an object of the present invention to provide, for solving the problems described above, a color image data compressing apparatus which can efficiently compress color image data with suppression of image degradation due to data compression by changing quantization efficiency of the data according to a type of input color image data.

In the present invention, when the data for the input color image data is quantized, the degree of quantization is changed according the input color image data, so that degradation of image quality due to data compression can be suppressed.

Other objects and features of this invention will become apparent from the following description with reference to the accompanying drawings.

DESCRIPTION OF PREFERRED EMBODIMENTS

Detailed description is made hereinafter for preferred embodiments of the present invention with reference to the related drawings.

Figure 1:
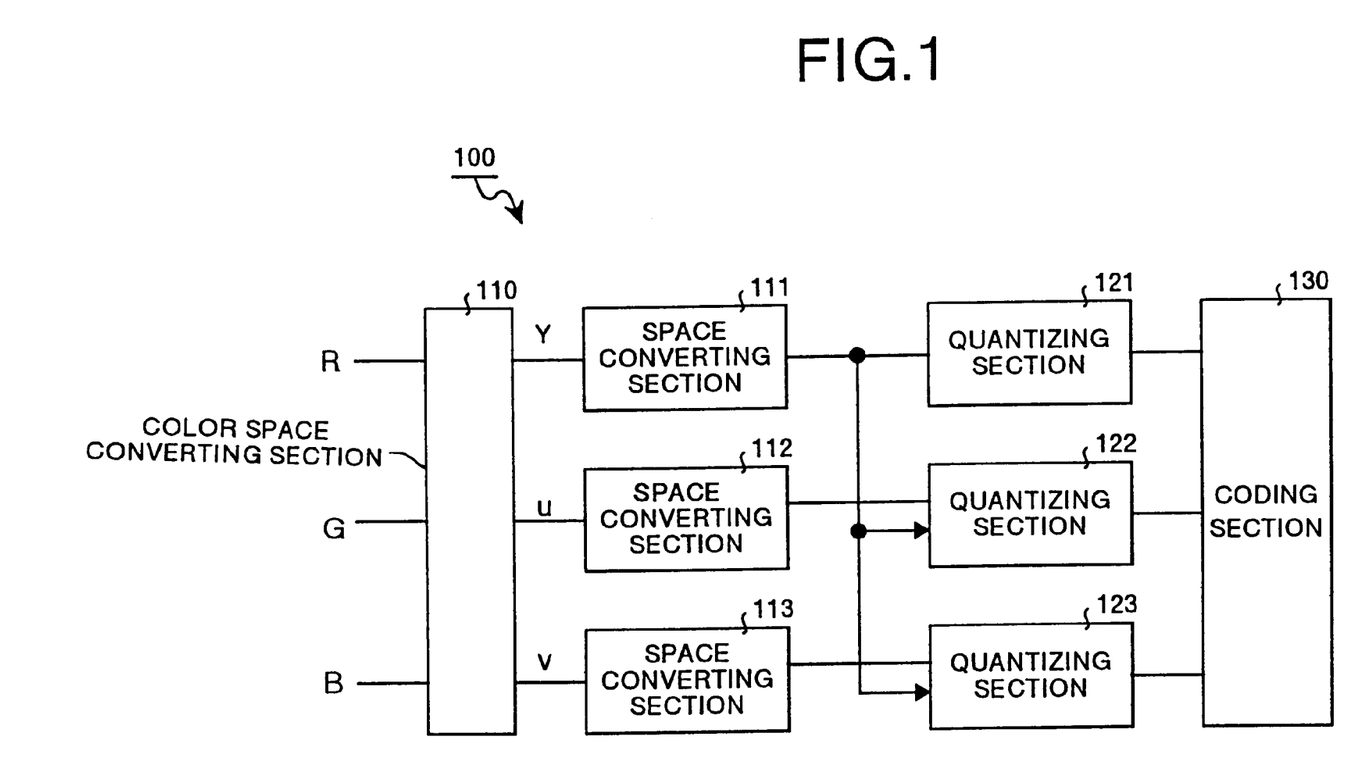
FIG. 1 is a block diagram showing one of the embodiments of the color image data compressing apparatus according to the present invention.

FIG. 1 shows one of the embodiments of the color image data compressing apparatus according to the present invention.

As shown in the figure, the color image data compressing apparatus (described simply as data compressing apparatus hereinafter) 100 comprises a color space converting section 110 for receiving RGB data and outputting data for lightness (Y) and chromaticity (u, v); first, second and third space converting sections 111, 112 and 113 each for converting the data for lightness (Y) and chromaticity (u, v) to coefficient data in specified conversion space for each block comprising a plurality of pixels respectively; first, second and third quantizing sections 121, 122 and 123 each for quantizing the coefficient generated in each of the space converting sections 111, 112 and 113 respectively; and a shared coding section 130 for coding data quantized in the quantizing sections 121, 122 and 123.

Output from the firs space converting section 111 is inputted not only into the first quantizing section 121 for quantizing coefficient data for lightness (Y) but also into the second and third quantizing sections 122 and 123 each for quantizing coefficient data for chromaticity (u, v) as a control signal respectively. Then, the second and third quantizing sections 122 and 123 are configured to change each degree of quantization of the coefficient data for the chromaticity (u, v) respectively according to the coefficient data for the lightness (Y) from the first space converting section 111. The symbol Y indicates a proportion between black and white, 100% of lightness corresponds to white and 0% of lightness corresponds to black. Symbols u and v indicate elements for deciding chromaticity, hue is decided by a ratio between u and v, and chroma (purity) is decided by the square root of a sum of each square of u and v, namely $\sqrt{(u^2+v^2)}$.

Next, operation of the data compressing apparatus 100 according to the embodiment is explained.

RGB data as input color image data is, at first, converted to data for lightness (Y) and data for chromaticity (u, v) in the color space converting section 110, the data Y is inputted into the first space converting section 111, the data u into the second space converting section 112, and the data v into the third space converting section 113 respectively. Each of the space converting sections 111, 112 and 113 executes conversion of the input data to coefficient data in specified transform space for each block having a plurality of pixels. Then, each of the coefficient data for Y, u and v generated in the space converting sections 111, 112 and 113 is quantized in the first, second, and third quantizing sections 121, 122 and 123 respectively, and is coded in the coding section 130.

When the coefficient data is to be quantized, the second and third quantizing sections 122 and 123 change the degree of quantization of the coefficient data for u and v respectively according to the coefficient data for Y obtained from the first space converting section 111. As described above, by changing the degree of quantization of the chromaticity subjected to space conversion according to a level of lightness, degradation of image quality due to data compression can be suppressed, and data compression efficiency can be enhanced.

Figure 2:
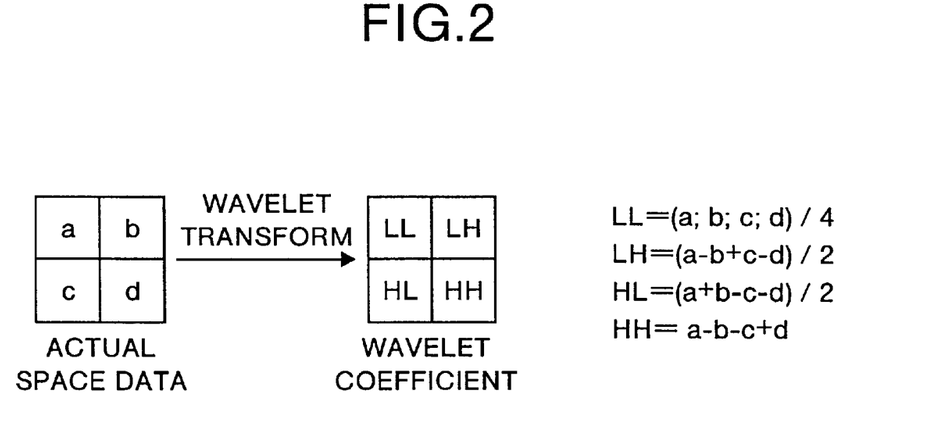
FIG. 2 is an explanatory view of wavelet conversion as an example of space conversion.
Figure 3:
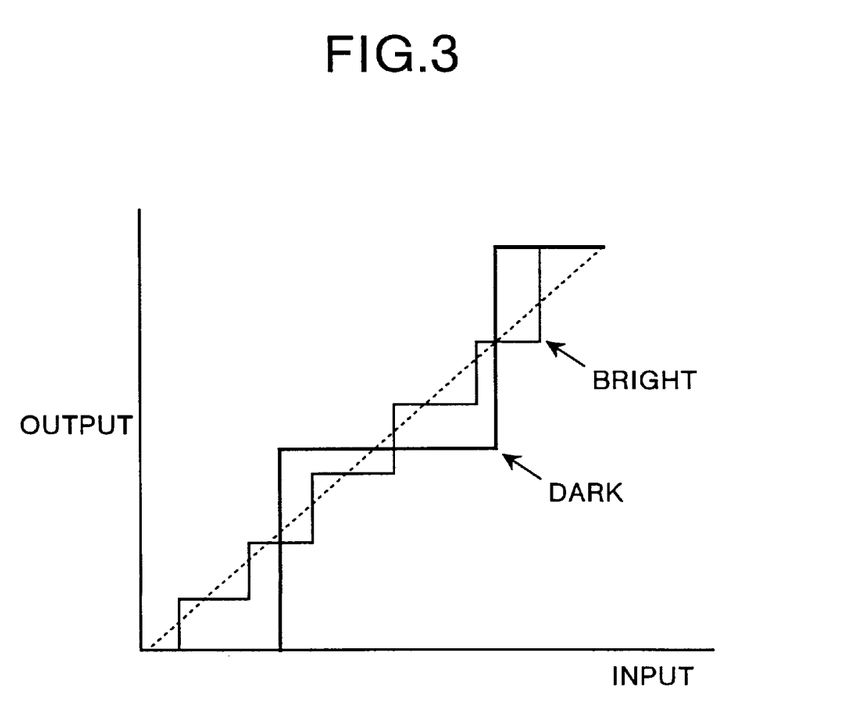
FIG. 3 is a block diagram showing another embodiment of the color image data compressing apparatus according to the present invention.

For example, when a color has low lightness (dark color), the color is not easily identified, which allows quantization to be performed so that degradation is inconspicuous as an image even if the degree of quantization of chromaticity information is enhanced. LL, which is a low-frequency component of a space conversion coefficient of data for lightness (Y) can be used as a parameter for controlling the degree of quantization, if the wavelet space sown in FIG. 2 is used as transform space. FIG. 3 shows an example of controlling the degree of quantization by using LL, and when LL is large (bright), a step for quantization is made smaller so that the reduction degree of data is made smaller, which makes degradation inconspicuous. When LL is small (dark), a step for quantization is made larger so that the rate of reducing data is made larger within a range in which degradation is inconspicuous. Consequently, degradation of image quality due to compression can be made inconspicuous as a whole, and amount of data can be efficiently reduced.

Figure 4:
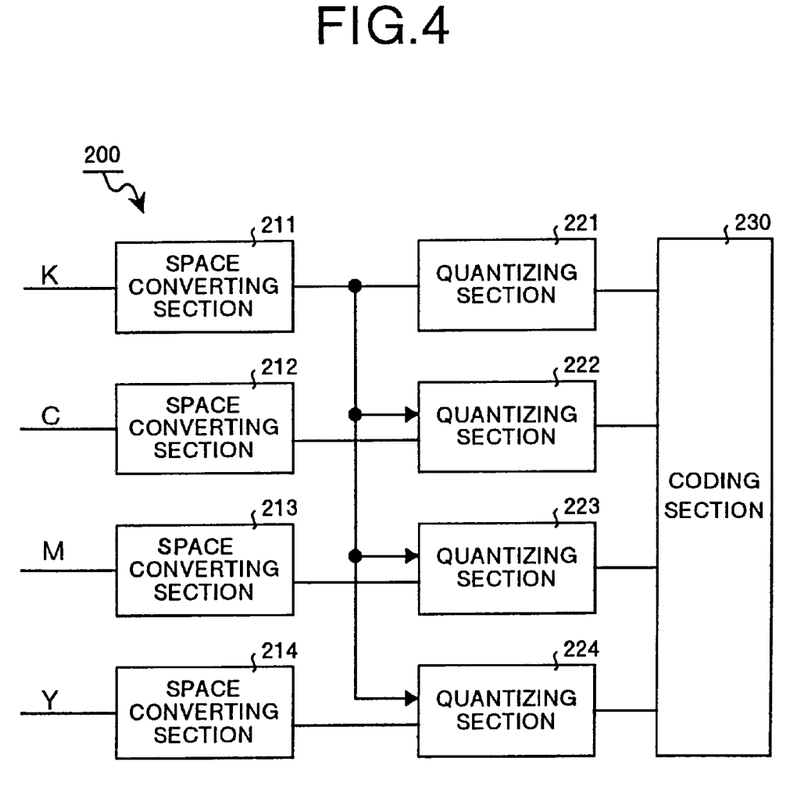
FIG. 4 is a block diagram showing another embodiment of the color image data compressing apparatus according to the present invention.

FIG. 4 shows another embodiment of the data compressing apparatus according to the present invention.

As shown in the figure, the data compressing apparatus 200 comprises first to fourth space converting sections 211, 212, 213 and 214 each for converting each data for Y (yellow), M (magenta), C (cyan) and K (black) respectively to coefficient data in specified transform space for each block comprising a plurality of pixels respectively; first to fourth quantizing sections 221, 222, 223 and 224 each for quantizing the coefficient generated in each of the space converting sections 211, 212, 213 and 214 respectively; and a shared coding section 230 for coding data quantized in the quantizing sections 221, 222, 223 and 224.

Output from the first space converting section 211 is inputted not only into the first quantizing section 221 for quantizing coefficient data for K but also into the second to fourth quantizing sections 222, 223 and 224 each for quantizing coefficient data for C, M and Y as a control signal respectively. Then, the second to fourth quantizing sections 222, 223 and 224 are configured to change each degree of quantization of the coefficient data for C, M and Y according to the coefficient data for K from the first space converting section 211 respectively.

Next, operation of the data compressing apparatus 200 according to the embodiment is explained.

Data Y, M, C and K as input color image data is inputted into the first to fourth space converting sections 211, 212, 213 and 214 respectively. Each of the space converting sections 211, 212, 213 and 214 executes conversion of the input data to coefficient data in specified transform space for each block having a plurality of pixels. Then, each of the coefficient data for Y, M, C and K generated in the space converting sections 211, 212, 213 and 214 is quantized in the first to fourth quantizing sections 221, 222, 223 and 224 respectively, and the data is coded in the coding section 230.

When the coefficient data is to be quantized, the second to fourth quantizing sections 222, 223 and 224 change the degree of quantization of the coefficient data for Y, M and C respectively according to the coefficient data for K obtained from the first space converting section 211. Namely, a parameter for controlling the degree of quantization of the coefficient data for Y, M and C is controlled, assuming that the wavelet space shown in FIG. 2 is used as transform space, by LL which is a low-frequency component in a space transform coefficient of data K. When LL is large (dark), a step for quantization is made larger so that the reduction rate of data is made larger, on the other hand, when LL is small (bright), a step for quantization is made smaller so that degradation is made inconspicuous. With these operations, degradation of image quality due to compression can be made inconspicuous as a whole for the data CMYK and amount of data can be efficiently reduced.

Figure 5:
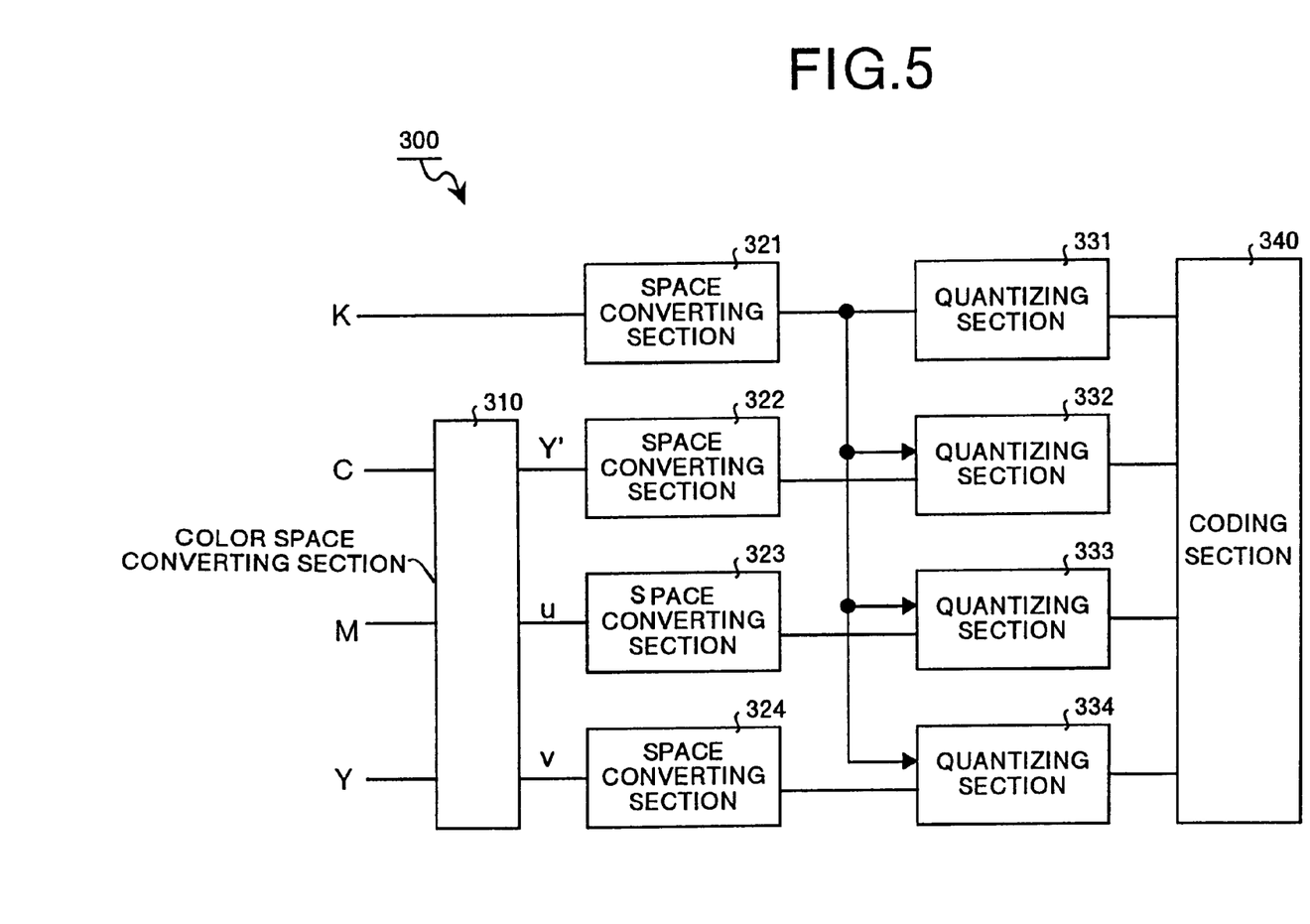
FIG. 5 is a block diagram showing another embodiment of the color image data compressing apparatus according to the present invention.

FIG. 5 shows another embodiment of the data compressing apparatus according to the present invention.

As shown in the figure, the data compressing apparatus 300 comprises a color space converting section 310 for receiving data excluding K, namely CMY data and outputting data for lightness (Y') and chromaticity (u, v); a first space converting section 321 for converting K data to coefficient data in specified transform space for each block comprising a plurality of pixels; second to fourth space converting sections 322, 323 and 324 each for converting the data y', u and v generated in the color space converting section 310 to coefficient data in specified transform space for each block comprising a plurality of pixels respectively; first to fourth quantizing sections 331, 332, 333 and 334 each for quantizing the coefficient generated in each of the space converting sections 321, 322, 323 and 324 respectively; and a shared coding section 340 for coding data quantized in the quantizing sections 331, 332, 333 and 334.

Output from the first space converting section 321 is inputted not only into the first quantizing section 331 for quantizing coefficient data for K but also into the second to fourth quantizing sections 332, 333 and 334 each for converting the coefficient data for Y', u and v as a control signal respectively. Then, the second to fourth quantizing sections 332, 333 and 334 are configured to change each degree of quantization of the coefficient data for C, M and Y according to the coefficient data for K from the first space converting section 321 respectively. It should be noted that Y, M, C and K indicate color data corresponding to amount of color material in yellow, magenta, cyan and black respectively. Y' indicates a proportion between black and white, 100% of lightness corresponds to white, and 0% of lightness corresponds to black. Symbols u and v indicate elements for deciding chromaticity, hue is decided by a ratio between u and v, and chroma (purity) is decided by the square root of a sum of each square of u and v, namely $\sqrt{(u^2+v^2)}$.

Next, operation of the data compressing apparatus 300 according to the embodiment is explained.

Of the data Y, M, C and K as input color image data, data K is inputted into the first space converting section 321, while the remaining data Y, M and C is inputted into the color space converting section 310. Each of the data Y, M and C is converted to data for lightness (Y') and data for chromaticity (u, v) in the color space converting section 310, and Y' data is inputted into the second space converting section 322, u data into the third space converting section 323, and v data into the fourth space converting section 324 respectively. Each of the space converting sections 321, 322, 323 and 324 executes conversion of the input data to coefficient data in specified transform space for each block having a plurality of pixels. Then, each of the coefficient data for K, Y', u and v generated in the space converting sections 321, 322, 323 and 324 is quantized in the first to fourth quantizing sections 331, 332, 333 and 334 respectively, and the data is coded in the coding section 340.

When the coefficient data is to be quantized, the second to fourth quantizing sections 332, 333 and 334 change the degree of quantization of the coefficient data for Y', u and v respectively according to the coefficient data for K obtained from the first space converting section 321. Namely, a parameter for controlling the degree of quantization of the coefficient data for Y', u and v is controlled, assuming that the wavelet space shown in FIG. 2 is used as transform space, by LL which is a low-frequency component of a space transform coefficient of data K. When LL is large (dark), a step for quantization is made larger so that the reduction rate of data is made larger, on the other hand, when LL is small (bright), a step for quantization is made smaller so that degradation is made inconspicuous. As described above, by changing the degree of quantization of the coefficient data for lightness (Y') and the coefficient data for chromaticity (u, v) according to a space transform coefficient for data K, degradation of image quality due to data compression can further effectively be suppressed as compared to that in the case of the previous embodiment, and data compression efficiency can also be enhanced.

Figure 6:
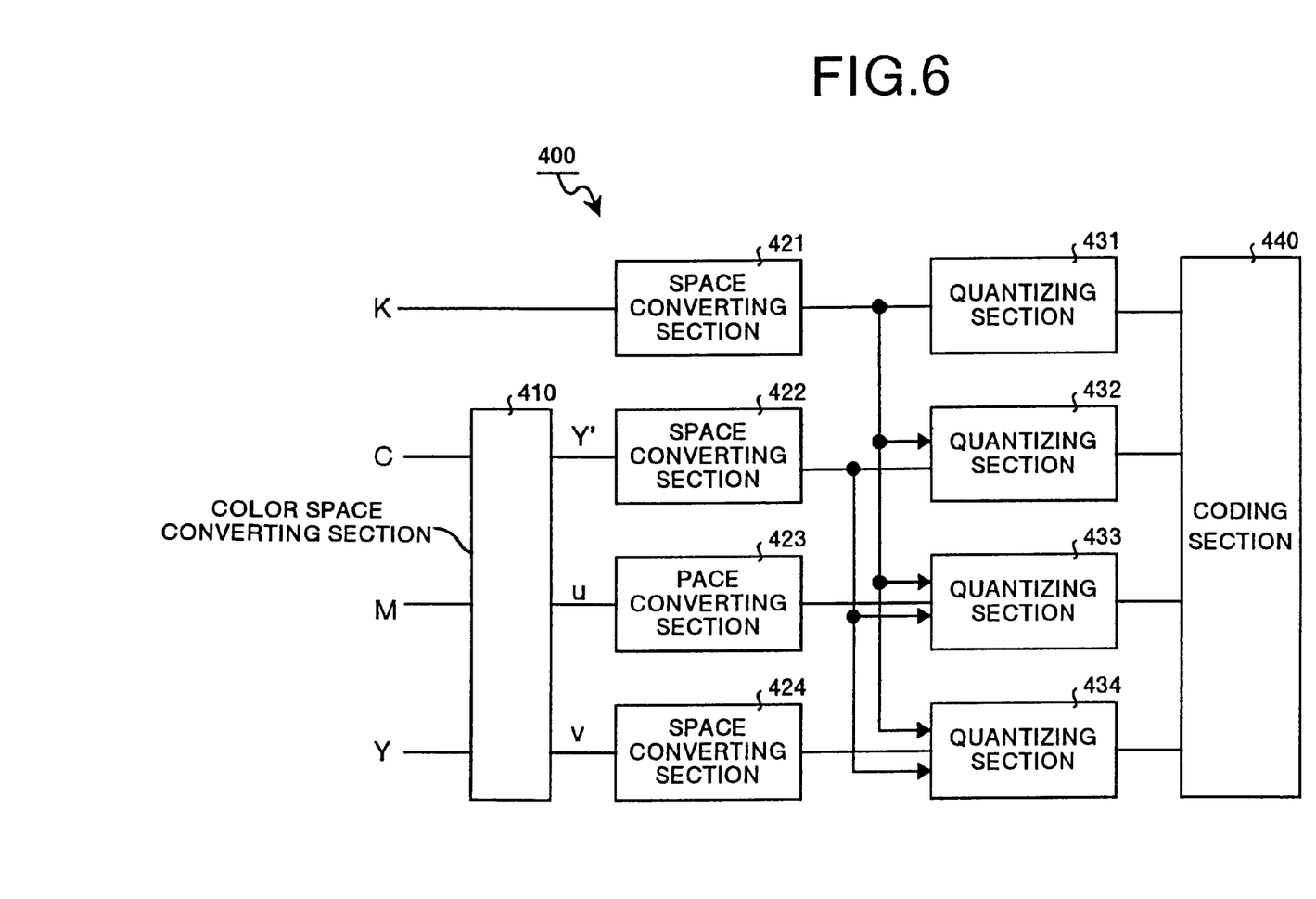
FIG. 6 is a block diagram showing another embodiment of the color image data compressing apparatus according to the present invention.

FIG. 6 shows another embodiment of the data compressing apparatus according to the present invention.

As shown in the figure, the data compressing apparatus 400 comprises a color space converting section 410 for receiving data excluding K, namely CMY data and outputting data for lightness (Y') and chromaticity (u, v); a first space converting section 421 for converting K data to coefficient data in specified transform space for each block comprising a plurality of pixels; second to fourth space converting sections 422, 423 and 424 each for converting the data Y', u and v generated in the color space converting section 410 to coefficient data in specified transform space for each block comprising a plurality of pixels respectively; first to fourth quantizing sections 431, 432, 433 and 434 for quantizing the coefficient generated in each of the space converting sections 421, 422, 423 and 424 respectively; and a shared coding section 440 for coding data quantized in the quantizing sections 431, 432, 433 and 434.

Output from the first space converting section 421 is inputted not only into the first quantizing section 431 for quantizing coefficient data for K but also into the second to fourth quantizing sections 432, 433 and 434 each for converting the coefficient data for Y', u and v as a control signal respectively. Then, output from the second space converting section 422 is inputted not only into the second quantizing section 432 for quantizing coefficient data for Y' but also into the third and fourth quantizing sections 433 and 434 each for quantizing the coefficient data for u and v as a control signal respectively. Then, the second to fourth quantizing sections 432, 433 and 434 are configured to change each degree of quantization of the coefficient data for Y', u and v respectively according to the coefficient data for K from the first space converting section 421. Further, the third and fourth quantizing sections 433 and 434 are configured to change each degree of quantization of the coefficient data for u and v according to the coefficient data for Y' from the second space converting section 422 respectively.

Next, operation of the data compressing apparatus 400 according to the embodiment is explained.

Of the data Y, M, C and K as input color image data, K data is inputted into the first space converting section 421, while the remaining data Y, M and C is inputted into the color space converting section 410. Each of the data Y, M and C is converted to data for lightness (Y') and data for chromaticity (u, v) in the color space converting section 410. Y' data is inputted into the second space converting section 422, u data into the third space converting section 423 and v data into the fourth space converting section 424 respectively. Each of the space converting sections 421, 422, 423 and 424 executes conversion of the input data to coefficient data in specified transform space for each block having a plurality of pixels. Then, each of the coefficient data for K, Y', u and v generated in the space converting sections 421, 422, 423 and 424 is quantized in the first to fourth quantizing sections 431, 432, 433 and 434 respectively, and the data is coded in the coding section 440.

When the coefficient data is to be quantized, the second quantizing section 432 changes the degree of quantization of the coefficient data for Y' according to the coefficient data for K obtained from the first space converting section 421. The third and fourth quantizing sections 433 and 434 change the degree of quantization of the coefficient data for u and v according to the coefficient data for K obtained from the first space converting section 421 as well as to the coefficient data for Y' obtained from the second space converting section 422.

In other words, the degree of quantization of Y data subjected to space conversion is controlled, if the wavelet space shown in FIG. 2 is used, by LL in a space transform coefficient of data K. When LL is large (dark), a step for quantization is made larger so that the reduction rate of data is made larger, on the other hand, when the amount of LL element is small (bright), a step for quantization is made smaller so that degradation is made inconspicuous. The degree of quantization of data u and v is controlled by LL in a space transform coefficient of data K as well as in a space transform coefficient of data Y, and when LL is large (dark), a step for quantization is made larger so that the reduction rate of data is made larger, on the other hand, when LL is small (bright), a step for quantization is made smaller so that degradation is made inconspicuous. The degree of quantization of K and Y data is controlled generally by a total of K and Y data, but the weighting toward K and Y is not defined.

As described above, by changing the degree of quantization of the coefficient data for lightness (Y') and of the coefficient data for chromaticity (u, v) according to a space transform coefficient for K data, degradation of image quality due to data compression can further effectively be suppressed as compared to the previous embodiment, and data compression efficiency can also be enhanced.

With the present invention as described above, excellent effects as follows can be achieved.

In the present invention, while input color image data is converted from data in actual space to coefficient data in specified transform space, quantized, and coded, the degree of quantization is changed according the input color image data, so that degradation of image quality due to data compression can be suppressed, and in addition, efficiency of data compression can be enhanced.

In the present invention, while data for lightness and chromaticity is generated from input data indicating each level to three spectral characteristics, the data is converted to coefficient data in each specified transform space respectively, and each of the coefficients is quantized, the degree of quantization of coefficient data for chromaticity is changed according to data for lightness, so that, when color image data consisting of three colors such as RGB is compressed, degradation of image quality due to data compression can be suppressed, and in addition, efficiency of data compression can be enhanced.

In the present invention, when input color image data consists of four types of color data each corresponding to an amount of each color material including a color material in black, the degree of quantization of other color data is changed according to data for black, so that when image data consisting of four colors such as CMYK is compressed, degradation of image quality due to data compression can be suppressed, and in addition, efficiency of data compression can be enhanced.

In the present invention, data for lightness and chromaticity is generated from three types of color data excluding data for black, each of the data is converted to coefficient data in each specified transform space respectively, each of the coefficients is quantized, and the degree of quantization of coefficient data for chromaticity is changed according to data for black, so that when image data consisting of four colors such as CMYK is compressed, degradation of image quality due to data compression can more effectively be suppressed, and in addition, efficiency of data compression can be enhanced further.

In the present invention, the degree of quantization of coefficient data for lightness and chromaticity is changed according to a space transform coefficient of data for black, and further, the degree of quantization of coefficient data for chromaticity is changed according to a space transform coefficient of data for lightness, so that degradation of image quality due to data compression can be effectively suppressed, and in addition, efficiency of data compression can be enhanced further.

This application is based on Japanese patent application No. HEI 9-340734 filed in the Japanese Patent Office on Nov. 26, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color image data compressing apparatus comprising:

a space converting unit configured to convert input color image data from data in actual space to coefficient data in specified transform space;

a quantizing unit configured to quantize the coefficient generated in said space converting unit; and a coding unit configured to code data quantized in said quantizing unit, wherein said quantizing unit is configured to change the degree of quantization according to input color image data, and further wherein said input color image data consists of four types of color data each corresponding to an amount of each color material including a color material in black and said quantizing unit is also configured to change the degree of quantization of other color data according to data for black.

2. The color image data compressing apparatus according to claim 1, further comprising:

a color space converting section configured to receive three types of color data excluding data for black and outputting data for lightness and chromaticity, wherein said space converting unit has a plurality of space converting sections each configured to convert data for lightness and chromaticity generated in said color space converting section to coefficient data in each specified transform space, respectively, and further wherein said quantizing unit has a plurality of quantizing sections each configured to quantize a coefficient generated in each of the space converting sections and each of the quantizing sections is configured to change the degree of quantization of the coefficient according to data for black.

3. The color image data compressing apparatus according to claim 2, wherein one of said quantizing sections configured to quantize a coefficient of data for chromaticity is configured to change the degree of quantization thereof according to the data for lightness.

* * * * *